United States Patent [19]
Courten

[11] Patent Number: 5,118,185
[45] Date of Patent: Jun. 2, 1992

[54] OPTICAL TRANSCEIVER APPARATUS FOR DYNAMIC BORESIGHT SYSTEMS

[75] Inventor: Henry C. Courten, Bay Shore, N.Y.

[73] Assignee: DRS/Photronics Corporation, Hauppauge, N.Y.

[21] Appl. No.: 584,650

[22] Filed: Sep. 19, 1990

[51] Int. Cl.$^5$ .................. G01B 11/26; G01C 1/00
[52] U.S. Cl. ........................... 356/152; 33/288
[58] Field of Search .......... 356/141, 152, 147, 400; 33/281, 282, 285, 286, 288

[56] References Cited

U.S. PATENT DOCUMENTS

| | | | |
|---|---|---|---|
| 3,816,000 | 6/1974 | Fiedler | 356/400 |
| 3,836,258 | 9/1974 | Courten et al. | 356/153 X |
| 3,867,038 | 2/1975 | Westell | 356/400 |
| 4,191,471 | 3/1980 | Courten et al. | 356/154 |
| 4,193,689 | 3/1990 | Reymond et al. | 356/152 |
| 4,306,806 | 12/1981 | Barron | 356/138 |
| 4,330,212 | 5/1982 | Miller | 356/354 |
| 4,560,272 | 12/1985 | Harris | 356/138 |
| 4,738,531 | 4/1988 | Lloyd et al. | 356/152 |
| 4,792,228 | 12/1988 | Haffner | 356/152 X |
| 4,804,270 | 2/1989 | Miller et al. | 356/355 |
| 4,808,064 | 2/1989 | Bartholet | 356/152 X |
| 4,896,962 | 1/1990 | Menn et al. | 356/152 |
| 4,932,777 | 6/1990 | Fodale et al. | 356/152 |
| 4,973,156 | 11/1990 | Dainis | 356/141 |

Primary Examiner—Stephen C. Buczinski
Attorney, Agent, or Firm—Marvin S. Gittes

[57] ABSTRACT

Optical transceiver apparatus for detecting angular misalignment between a pylon and fuselage of a helicopter, includes an optical transmitter secured to one of the pylon and fuselage and which transmits three spaced optical beams; an optical receiver which receives the optical beams from each optical transmitter, the optical receiver being mounted on another one of the pylon and fuselage, the optical receiver including a two linear detectors which detects angular twist between the pylon and fuselage from a null position in response to two of the optical beams, substantially irrespective of the distance between the pylon and fuselage, and a radially variable detector which detects elevation and azimuth changes of the pylon with respect to the fuselage from a null position in response to the third of the optical beams, substantially irrespective of the distance between the pylon and fuselage.

19 Claims, 3 Drawing Sheets

OPTICAL TRANSCEIVER APPARATUS FOR DYNAMIC BORESIGHT SYSTEMS

BACKGROUND OF THE INVENTION

This invention relates generally to optical transceiver apparatus, and more particularly to optical transceiver systems for dynamic boresight systems of advanced attack helicopters.

In advanced attack helicopters, such as the AH-64 Apache, AH-1 and other helicopters, pylons attached to short wing sections of the aircraft are provided for carrying short range, quick response, gun systems. Gun system accuracy in such arrangements is the product of many factors which vary before, during and after combat maneuvers. These factors may include wing bending, mechanical friction between moving parts, backlash from gears, structural vibration, deflection of the airframe, recoil and the like. A greater appreciation for the factors involved may be obtained by reference, for example, to the article "Guns of the Fighter Helicopter" by Frank Colucci, in the publication Defence Helicopter World, August–September, 1989.

Thus, it is necessary to boresight the gun systems for the location where they are typically aimed. This is a tedious, time consuming operation which heretofore was accomplished with ground based sighting arrangements before the helicopter left for a mission. For example, according to U.S. Army statistics, typically it takes three personnel four hours to boresight an AH-64 helicopter and thirteen hours to boresight an AH-1 helicopter. However, aircraft flex, twist and vibration in flight render the continued accuracy of corrections or calibration doubtful particularly when the same are implemented when the helicopter is on the ground. In such ground based boresight systems, external support equipment, such as telescopes, accelerometers, inclinometers, gyroscope platforms and the like, are generally required for such boresighting. This external support equipment is employed to make either physical adjustments to the aircraft or computer bias entries depending upon the nature of the outputs provided by the measuring equipment.

An angular orientation system is taught in U.S. Pat. No. 3,836,258 to Courten et al. This patent describes an angular orientation measuring apparatus in which a split image of a target is produced by a wedge deviation technique. The wedge deviation technique, in addition to being provided with a wedge assembly, can be provided with optical means. Specifically, four lenses are used to produce a split image of a target line reticle carried on a body. The system cannot be used to produce three-axis orientation.

An aircraft alignment system is also taught in U.S. Pat. No. 4,191,471 to Courten et al. Here the boresight axis of armament is aligned using a collimated beam of light. Specifically, a light source is provided on the gunpod, and supplies collimated light to a collimator secured to a transfer jig temporarily secured to the frame of the aircraft which is parked on the ground. The system cannot provide three-axis orientation, and cannot be used for dynamic, in-flight correction.

U.S. Pat. No. 4,808,604 to Bartholet discloses a micropositioning apparatus for a robotic arm which provides a three-axis orientation. The purpose of this apparatus is firstly to determine precise positional information, and secondly, to determine deflection. With this system, five light sources are provided for each of the shoulder-elbow arrangement and the wrist-elbow arrangement, with each arrangement also having an optical detecting system associated therewith having three optical detectors.

With this system each detector array senses target motion along a single axis parallel to the longitudinal motion and can only be mathematically converted to angular motion if the distance between light sources and detectors is precisely known. This occurs since the focussing and cylindrical lens assemblies are affixed to the detector body, thus being capable only of performing a translational measurement, rather than a direct angular measurement. In this manner, roll angle measurement resolution improves with increased spacing between selected light source pairs. The system requires light source activation in a repetitive sequence in a time-multiplexed fashion to determine the direction of deflection. Numerous light sources are also required. Accordingly, this system is not considered to be applicable for boresighting applications on helicopter, gunships or the like.

U.S. Pat. No. 4,804,270 to Miller discloses a multi-axis alignment apparatus in which displacement of a member relative to a reference plane is determined. The apparatus utilizes a transmitter and a receiver spaced apart a predetermined distance. A reference energy beam coaxially passes a light diffraction grating having a ruled surface. The grating passes a zero order portion of the beam through undeviated, and diffracts a multiplicity of beams of first, second, third and higher orders at constant angles to the zero order portion, the angles varying with the frequency of the grating. A coaxial sleeve movably mounts the light diffraction grating to provide a roll zero reference. The zero part of the beam provides the zero reference for pitch and yaw. The first order beams provide zero reference for roll.

However, this apparatus requires the use of a coherent light source to provide high energy and sharply defined zero and first order beams exiting from the constant deviation prisms. Further, by requiring the use of single optical source in the form of an HeNe laser, a ruled grating and deviation prisms to generate three parallel beams of light, it is difficult to obtain precise alignment of each element relative to the entire transmitter sub-system. Still further, the components, including the laser, grating and constant deviation prisms, are relatively expensive. In addition, the use of cylindrical lenses in close proximity to the roll axis detectors, in order to improve roll sensitivity, greatly limits the angular acquistion and measurement of any system employing reasonably sized components.

Other less relevant system which include positional alignment systems are described in U.S. Pat. Nos. 4,306,806 to Barron, 4,330,212 to Miller, 4,560,272 to Harris and 4,792,228 to Haffner.

Thus, for example, U.S. Pat. No. 4,330,212 to Miller is directed to a tri-axis laser alignment system which measures angular displacement of pitch, yaw and roll using multiple laser beams, optical detectors and grating arrangements.

U.S. Pat. No. 4,306,806 to Barron is directed to an angular alignment device using a collimated light source associated with one of two objects and a prism associated with the other of two objects. A viewing screen is provided for viewing images created by the light source and the prism to provide an indication of the relative orientation of the two objects. The resulting two images provide an indication of the relative orientation of the two objects about three mutually orthogonal axes. The apparatus is particularly useful for detecting and correcting changes in the orientation of a gun tube after firing.

OBJECTS AND SUMMARY OF THE INVENTION

Accordingly, it is an object of the present invention to provide optical transceiver apparatus for dynamic boresight systems that is suitable for airborne applications and overcomes the aforementioned problems in the prior art.

It is another object of the present invention to provide optical transceiver apparatus for a dynamic boresight system which can boresight a gun system for an airborne aircraft without external support equipment or specially trained ground personnel.

It is still another object of the present invention to provide optical transceiver apparatus for dynamic boresight system which can boresight a gun system for an aircraft repeatedly during flight to provide instantaneous alignment information regarding wing pylon stations.

It is yet another object of the present invention to provide optical transceiver apparatus for a dynamic boresight system that provides angular displacement information irrespective of separation distance between the optical transmitter and the optical receiver.

It is a further object of the present invention to provide optical transceiver apparatus for a dynamic boresight system that can provide angular displacement information employing a continuous light source.

It is a still further object of the present invention to provide optical transceiver apparatus for a dynamic boresight system that provides angular displacement information for pitch and yaw with only a single light source.

It is a yet further object of the present invention to provide optical transceiver apparatus for a dynamic boresight system that uses the airborne weapons system itself for boresight harmonization.

It is another object of the present invention to provide optical transceiver apparatus for a dynamic boresight system that has no moving parts.

It is still another object of the present invention to provide optical transceiver apparatus for a dynamic boresight system which can perform a boresight operation for an aircraft within ten minutes.

It is still another object of the present invention to provide optical transceiver apparatus for a dynamic boresight system that has a total system accuracy less than or equal to 0.05 milliradians (3 sigma).

It is yet another object of the present invention to provide optical transceiver apparatus for a dynamic boresight system that provides boresighting under static and dynamic (real-time) conditions.

It is a further object of the present invention to provide optical transceiver apparatus for a dynamic boresight system that requires low power and has a long life.

It is a still further object of the present invention to provide optical transceiver apparatus for a dynamic boresight system that provides three-axis orientation.

In accordance with an aspect of the present invention, optical transceiver apparatus for detecting angular misalignment between two bodies, includes optical transmitter means for transmitting three spaced optical beams, the optical transmitter means being mounted on one the body; optical receiver means for receiving the optical beams from the optical transmitter means, the optical receiver means being mounted on the other body, the optical receiver means including roll angle detection means for detecting angular twist between the bodies from a null position in response to two of the optical beams, substantially irrespective of distance between the bodies, and elevation/azimuth detection means for detecting elevation and azimuth changes of the two bodies from a null position in response to the third of the optical beams, substantially irrespective of distance between the bodies.

The above and other objects, features and advantages of the present invention will become readily apparent from the following detailed description which is to be read in connection with the accompanying drawings.

DETAILED DESCRIPTION OF A PREFERRED EMBODIMENT

Figure 1:
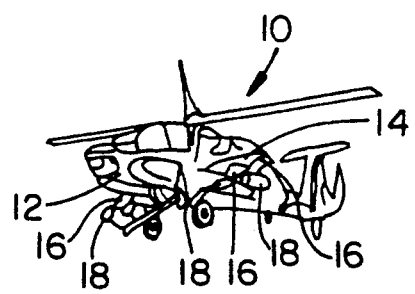
FIG. 1 is a perspective view of an advanced attack helicopter with which the present invention can be used.

Referring to the drawings in detail, and initially to FIG. 1 thereof, an advanced attack helicopter 10 with which the present invention can be used, includes a main body or fuselage 12 with side wing sections 14. Two pylons 16 are secured to the underside of each wing section 14, with each pylon carrying a gun system 18. A computer system (not shown) on the fuselage, is provided for aiming each gun system 18 for firing. However, as discussed above, because of various factors, such as wing bending, twisting, mechanical friction between moving parts, backlash from gears, structural vibration, deflection of the airframe, recoil and the like, accuracy in aiming the boresight of the gun systems is diminished.

In accordance with the present invention, as will now be described, a real-time dynamic input is automatically provided with instantaneous alignment information regarding wing sections 14 and pylons 16, and thereby of gun systems 18, and additionally, an automated misalignment assessment system which enable the aircrew to initiate a simple boresight routine on the ground or in the air.

It will be appreciated that flexure of wing sections 14 must not only be boresighted under static conditions on the ground, but also requires real-time monitoring during flight.

Thus, in accordance with the present invention, optical transceiver apparatus 20 is provided in fuselage 12 and pylons 16. As a result, each pylon 16 can be individually monitored with respect to the fuselage throughout its complete range of articulation.

Figure 2A:
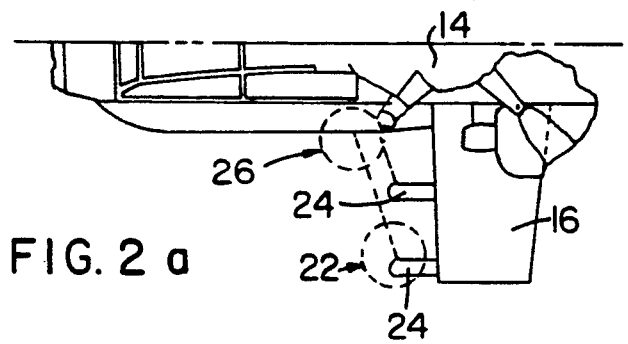
FIG. 2(a) is an enlarged elevational view of a portion of the helicopter of FIG. 1 with the optical transceiver apparatus of the present invention in the pylons and fuselage.
Figure 2B:
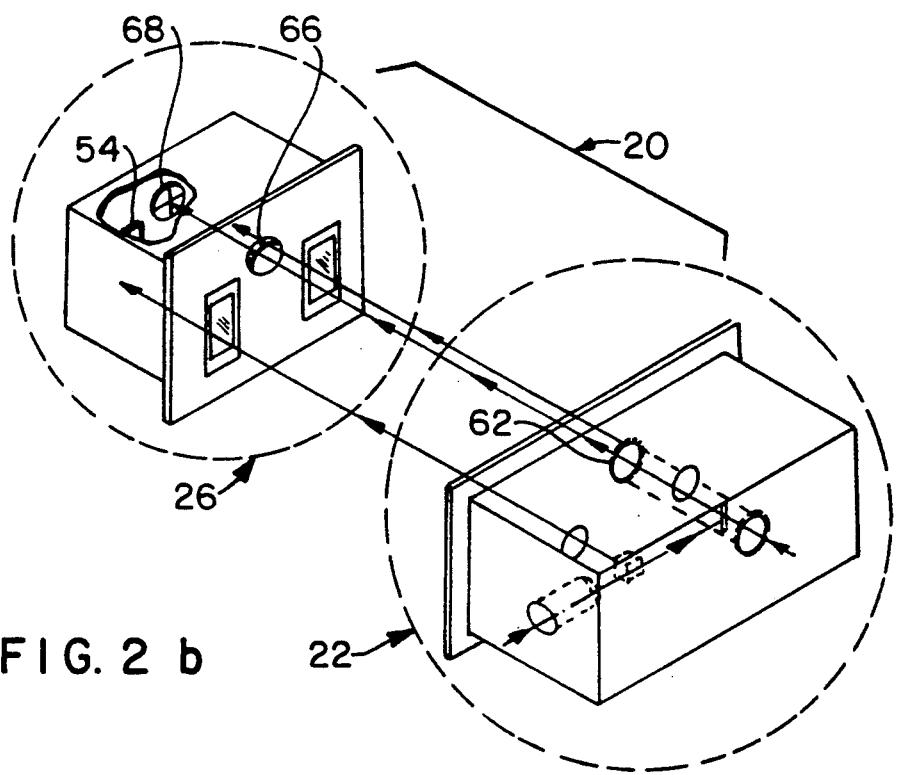
FIG. 2(b) is an enlarged view of the optical transceiver apparatus of the present invention.

Specifically, as shown in FIG. 2, optical transceiver apparatus 20 includes an optical transmitter 22 mounted on an extension 24 of each pylon 16 and an optical receiver 26 mounted on fuselage 12 in close proximity thereto. Optical receiver 26 is preferably mounted in the avionics bay or just inside the fuselage skin line. It will be appreciated from FIG. 2 that two or more optical transmitters 22 can be mounted on each pylon 16, with a corresponding number of optical receivers 26 being mounted on fuselage 12 in association therewith. The reason for mounting optical transmitters 22 in pylons 16 is because constant power is always available in the vicinity of pylons 16, so that no additional wiring in wing sections 14 is required to power up the light sources. Power can be supplied from a commerically available 12 VDC battery pack or 28 VDC aircraft power.

Figure 3:
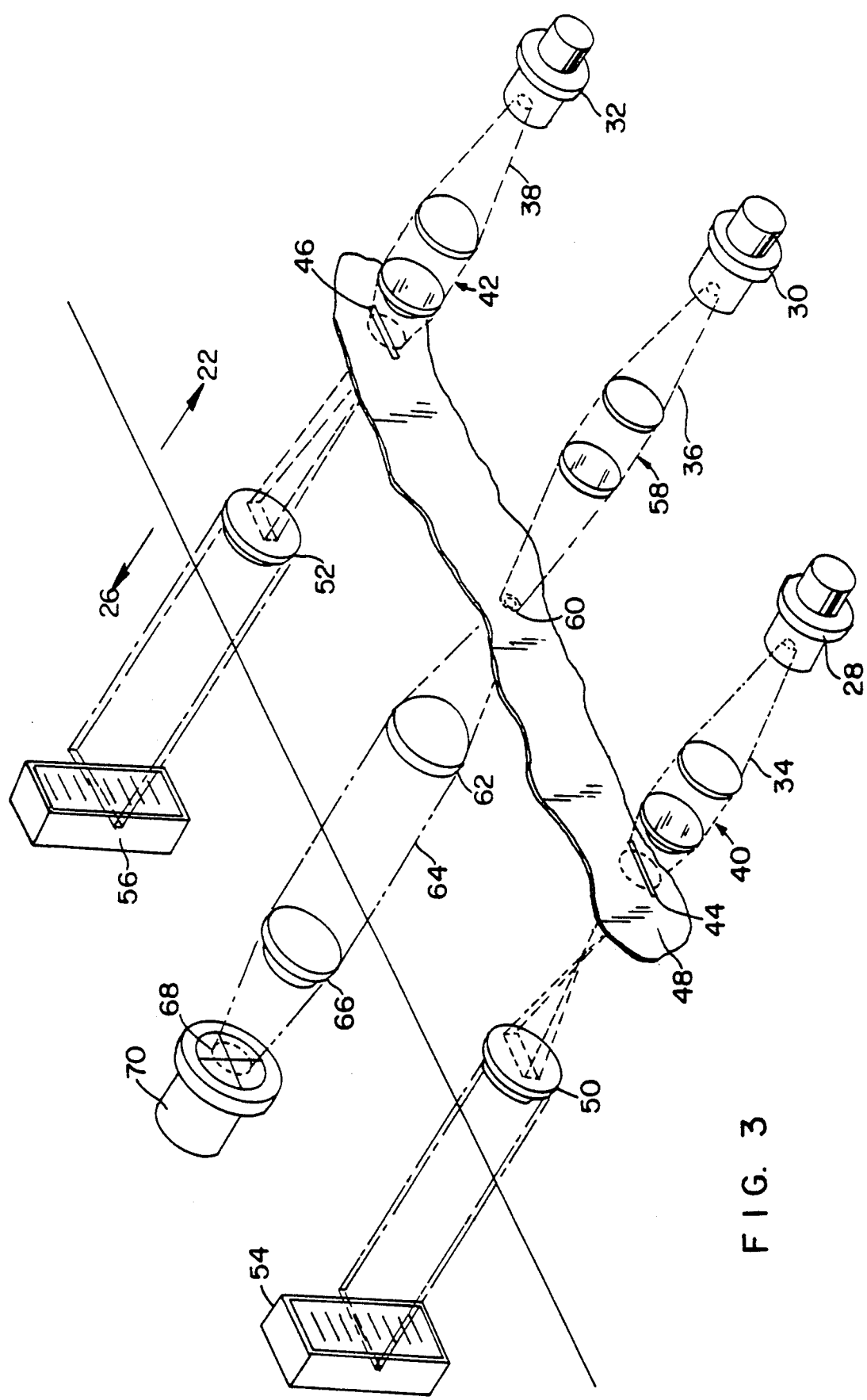
FIG. 3 is a detailed schematic diagram of the optical transceiver apparatus according to the present invention.

As shown in FIG. 3, each optical transmitter 22 includes light sources 28, 30 and 32, for example, high performance, long-life, gallium-arsenide laser diodes, LEDs or the like, which produce three pencil-sized, parallel and coplanar optical beams 34, 36 and 38 of energy, separated from each other by about one inch. Alternatively, a common light source can be provided for emitting the three optical beams. Light sources 28, 30 and 32 may be AC coupled or otherwise encoded to prevent cross-talk and maintain covert transmission. In addition, the light emitted by the light sources is preferably infrared or near-infrared optical energy. Although light sources 28, 30 and 32 can provide light of a continuous nature, it is preferable that the transmitted optical beams 34, 36 and 38 are pulsed to achieve higher instantaneous light output. The duty cycle is selected to provide optimum cooling time for the diodes. Further, the light beams can be pulse coded and/or narrow band optically filtered to preclude interference from intruding ambient light.

Optical beams 34 and 38 are focussed by lens systems 40 and 42 onto slits 44 and 46, respectively, in a plate 48. Slits 44 and 46 lie near the focal planes of objective lenses 50 and 52, respectively, and are used for roll or twist angle measurements.

The light beams through objective lenses 50 and 52 are focussed on parallel-mounted linear, silicon detectors 54 and 56 of the corresponding optical receiver 26. The current generated in detectors 54 and 56 is directly proportional to the position of the optical energy transmitted to them. With this arrangement, any change in roll angle orientation between optical transmitter 22 and optical receiver 26, and thereby between pylon 16 and fuselage 12, results in a differential separation of the images from slits 44 and 46 on linear detectors 54 and 56. However, angular displacements between optical transmitter 22 and optical receiver 26 along any other axis, as well as vertical or lateral displacements therebetween, will not cause a change in the differential signal outputs between detectors 54 and 56. In other words, the optical beams from light sources 28 and 32 contain pure angular information so that the detector outputs may be interpreted as an angular measurement.

It will be appreciated that, while distance between optical transmitter 22 and optical receiver 26 is optimized for a specific slit image width on linear detectors 54 and 56, the signal outputs from linear detectors 54 and 56 are effectively insensitive to such distance since linear detectors sense only slit image centroid and will function without loss of accuracy so long as a certain minimum level of optical energy flux density is maintained. However, as a general rule, optical transmitter 22 and optical receiver 26 can be separated up to approximately fifteen feet.

For detecting elevation (altitude) and azimuth (yaw) changes, optical beam 36 from light source 30 is focussed by a condensing lens system 58 on a circular aperture 60 in plate 48 which lies in the focal plane of a collimating lens 62 of optical transmitter 22. Thus, a collimated beam 64 of optical energy is projected to a decollimating objective lens 66 of optical receiver 26. Lens 66 decollimates beams 64 and impinges a defocussed spot 68 on a radially variable or quad cell, silicon detector 70. It will be appreciated that spot 68 is an image of circular aperture 60 and is sized by decollimating lens 66 to meet the spatial distribution and energy density requirements of detector.

With this elevation/azimuth detection, it will be appreciated that the distance between optical transmitter 22 and optical receiver 26 is irrelevant since the optical coupling is by means of a collimated optical beam 64 with lens 66 at the receiver controlling the size of the spot formed on detector 68. Further, as in the roll axis detection system, detection of elevation/azimuth is sensitive only to angular displacements, that is, vertical and horizontal displacements do not produce changes in the output signal from radially variable detector 70. In other words, the optical beam from light source 30 contains pure angular information so that the detector output may be interpreted as angular measurements.

Thus, detection occurs about each of three mutually orthogonal axes of rotation of one body (pylon 16) with respect to another body (fuselage 12).

Figure 4:
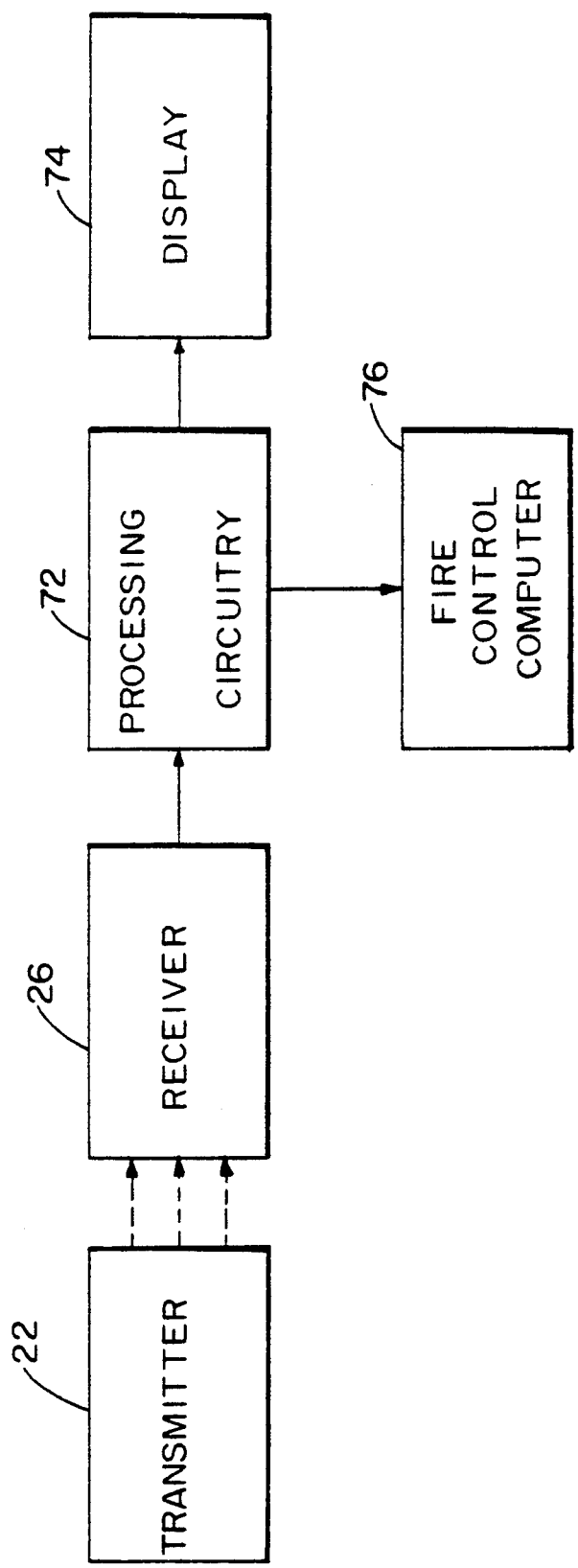
FIG. 4 is a block diagram of the optical transceiver apparatus according to the present invention.

Further, when rotation about the line connecting optical transmitter 22 to optical receiver 26 occurs, the outputs from detectors 54 and 56 are supplied to processing circuitry 72 which supplies signals corresponding to the differential angular measurement to a display 74, such as a meter or the like, as shown in FIG. 4, as a deviation from the initial aligned condition. This deviation may be dextro or levo rotation and may be expressed as plus or minus roll angle in a coordinate system. Display 74 can display the output as a digitized angle or an actual angle biased from zero or null. For such purpose, processing circuitry 72 can employ a differential amplifier and comparator circuit to determine the change in energy between detectors 54 and 56. Rotation can be monitored in the roll mode for plus or minus 45 degrees.

In like manner, when optical transmitter 22 is tipped relative to the line connected with optical receiver 26, the output signal from radially variable detector 70 is supplied to processing circuitry 72 as a signal proportional to the amount of angular tilt. Simultaneous tilt along two axes will produce a pattern of electrical signals which is processed by processing circuitry 72 to reduce the vector sum to its individual components, which can be displayed in the form of elevation and azimuth angles on display 74, which may take the form of meters or similar devices, Alternatively, displays 74 can be provided for expressing only alignment or nulling between optical transmitter 22 and optical receiver 26, or still further, as an acceptable error band about the null readings. In addition, and more importantly, the output error signals from receivers 26 supplied to a fire control computer 76 to provide corrections when firing gun systems 18.

With the above arrangement, each pylon 16 can be monitored through its complete range or articulation during a flight. Further, because of this arrangement, there is an extremely lower power requirement which, along with a long life of the components, permits continuous usage.

Further, apparatus 20 can provide in-flight boresight verification without any external apparatus. Apparatus 20 further has no moving parts, provides total boresight time within ten minutes and provides total system accuracy less than or equal to 0.05 milliradians (3 sigma). Apparatus 20 therefore ascertains the amount of misalignment whenever aircraft power is on without any action by the aircrew.

It will be appreciated that the above the optical lenses can be made of an acrylic or polycarbonate material, which is preferred over glass.

Thus, with the present invention, boresighting a gun system for an aircraft without external support equipment or specially trained ground personnel can be provided. Such boresighting can be provided repeatedly in flight to provide instantaneous alignment information regarding wing pylon stations. As a result, angular displacement information is provided irrespective of separation distance between the optical transmitter and the optical receiver, with a continuous light source and with no moving parts. Such operation can occur within ten minutes and with a total system accuracy less than or equal to 0.05 milliradians (3 sigma). Such boresighting can be performed under static and dynamic (real-time) conditions.

Having described a specific preferred embodiment of the invention with reference to the accompanying drawings, it will be appreciated that the present invention is not limited to the precise embodiment or application described, and that various changes and modifications may be effected therein by one of ordinary skill in the art without departing from the scope or spirit of the invention as defined in the appended claims.

What is claimed is:

1. Optical transceiver apparatus for detecting angular misalignment between two bodies, comprising:
   optical transmitter means for transmitting three spaced optical beams, said optical transmitter means being mounted on one of said bodies;
   optical receiver means for receiving said optical beams from said optical transmitter means, said optical receiver means being mounted on another of said bodies, said optical receiver means including:
      roll angle detection means for detecting angular twist between said bodies from a null position in response to two of said optical beams, substantially irrespective of the distance between said bodies said roll angle detection means including two spaced linear detectors which receive said two optical beams, respectively, and which generate output signals corresponding to twist between said bodies in response thereto;
      elevation/azimuth detection means for detecting elevation and azimuth changes of said two bodies from a null position in response to the third of said optical beams, substantially irrespective of the distance between said bodies; and
   said optical transmitter means including light source means for generating three original optical beams, a plate having two spaced slits, first focussing means for focussing two of said three original optical beams onto said slits, respectively, and second focussing means for focussing said two optical beams passing through said slits onto said two spaced linear detectors, respectively, as two spaced and focussed optical beams.

2. Optical transceiver apparatus according to claim 1, wherein one of said three original optical beams is collimated and the remaining beams are focused to lines on said spaced linear detectors.

3. Optical transceiver apparatus according to claim 1, wherein said three original optical beams are of a substantially infrared frequency.

4. Optical transceiver apparatus according to claim 1, wherein said three original optical beams are pulsed.

5. Optical transceiver apparatus according to claim 1, wherein said three original optical beams are coplanar and parallel.

6. Optical transceiver apparatus according to claim 1, wherein said three original optical beams are encoded.

7. Optical transceiver apparatus according to claim 1, wherein said light source means includes at least one laser diode.

8. Optical transceiver apparatus according to claim 1, wherein said light source means includes at least one light emitting diode.

9. Optical transceiver apparatus for detecting angular misalignment between two bodies, comprising:
   optical transmitter means for transmitting three spaced optical beams, said optical transmitter means being mounted on one of said bodies;
   optical receiver means for receiving said optical beams from said optical transmitter means, said optical receiver means being mounted on another of said bodies, said optical receiver means including:
      roll angle detection means for detecting angular twist between said bodies from a null position in response to two of said optical beams, substantially irrespective of the distance between said bodies; and
      elevation/azimuth detection means for detecting elevation and azimuth changes of said two bodies from a null position in response to the third of said optical beams, substantially irrespective of the distance between said bodies, said elevation/azimuth detection means including a radially variable detector which receives said third of said optical beams and produces an output signal corresponding to elevation and azimuth changes of said two bodies from a null position in response thereto.

10. Optical transceiver apparatus according to claim 9, wherein said optical transmitter means includes light source means for generating three original optical beams; said optical transmitter means including a plate having a circular aperture, condensing lens means for focussing one of said original optical beams on the circular aperture, and collimating lens means for collimating said optical beam passing through said circular aperture; and said elevation/azimuth detection means includes decollimating lens means for decollimating said optical beam from said collimating lens and supplying said decollimated optical beam to said radially variable detector.

11. Optical transceiver apparatus according to claim 9, wherein said third of said optical beams is collimated.

12. Optical transceiver apparatus according to claim 9, wherein said three original optical beams are of a substantially infrared frequency.

13. Optical transceiver apparatus according to claim 9, wherein said three original optical beams are pulsed.

14. Optical transceiver apparatus according to claim 9, wherein said three original optical beams are coplanar and parallel.

15. Optical transceiver apparatus according to claim 9, wherein said three original optical beams are encoded.

16. Optical transceiver apparatus according to claim 9, wherein said light source means includes at least one laser diode.

17. Optical transceiver apparatus according to claim 9, wherein said light source means includes at least one light emitting diode.

18. Optical transceiver apparatus for detecting angular misalignment between two bodies, one of said bodies being a pylon mounted to a wing section of an aircraft, and another one of said bodies being a fuselage of the aircraft, comprising:

optical transmitter means for transmitting three spaced optical beams, said optical transmitter means being mounted on one of said bodies;

optical receiver means for receiving said optical beams from said optical transmitter means, said optical receiver means being mounted on another of said bodies, said optical receiver means including:

roll angle detection means for detecting angular twist between said bodies from a null position in response to two of said optical beams, substantially irrespective of the distance between said bodies; and elevation/azimuth detection means for detecting elevation and azimuth changes of said two bodies from a null position in response to the third of said optical beams, substantially irrespective of the distance between said bodies.

19. Optical transceiver apparatus for detecting angular misalignment between two bodies, comprising:

a) optical transmitter means for transmitting three spaced optical beams, said optical transmitter means being mounted on one said bodies;

b) optical receiver means for receiving said optical beams from said optical transmitter means, said optical receiver means being mounted on another of said bodies, said optical receiver means including:

i) roll angle detection means for detecting angular twist between said bodies from a null position in response to two of said optical beams, substantially irrespective of the distance between said bodies, said roll angle detection means including A) two spaced linear detectors which receive said two optical beams, respectively, and which generate output signals corresponding to twist between said bodies in response thereto, and B) means for focussing two of said optical beams as two linear beams onto said two spaced linear detectors, respectively, and ii) elevation/azimuth detection means for detecting elevation and azimuth changes of said two bodies from a null position in response to the third of said optical beams, substantially irrespective of the distance between said bodies.

* * * * *